R. W. Jones,

Snap Hook,

No. 1,691. Reissued June 7, 1864.

Witnesses:
Henry Morris
C. L. Wolff

Inventor:
Richd. W. Jones
(per Munn & Co.)
Attorneys

N. PETERS, PHOTO-LITHOGRAPHER, WASHINGTON, D. C.

UNITED STATES PATENT OFFICE.

RICHARD W. JONES, SYRACUSE, NEW YORK.

IMPROVED HARNESS-SNAPS.

Specification forming part of Letters Patent No. 40,486, dated November 3, 1863; Reissue No. 1,691, dated June 7, 1864.

*To all whom it may concern:*

Be it known that I, RICHARD W. JONES, of Syracuse, in the county of Onondaga and State of New York, have invented a new and useful Improvement in Snap-Hooks; and I do hereby declare that the following is a full, clear, and exact description thereof, which will enable those skilled in the art to make and use the same, reference being had to the accompanying drawings, making a part of this specification, in which—

Figure 1:
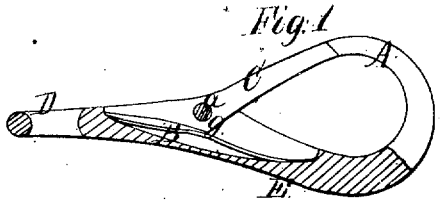
Figure 2:
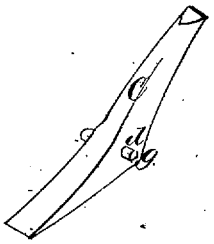
Figure 3:
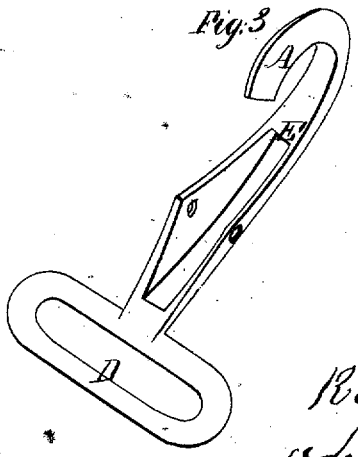

Figure 1 represents a sectional side elevation of my invention. Fig. 2 is a detached perspective view of the tongue. Fig. 3 is a detached perspective view of the hook.

Similar letters of reference indicate corresponding parts.

This invention consists in placing the spring which acts upon the tongue of the hook loosely into a recess cast or otherwise produced in the body or shank of the hook and holding it in place by the tongue itself, in such a manner that the construction of the snap-hook is considerably simplified, and a good article of this class can be produced at little expense; also, in combining the cam of the tongue with the spring, so that the force in opening the tongue is diminishing instead of increasing, as usual.

My hook is composed of the ordinary loop D and shank E and the ordinary hook A, which are united in one piece, either cast or made in any other desirable manner, and which form the body of the snap, as represented in Fig. 3 of the drawings. The shank E is grooved for the reception of the spring B, which may be made of a flat or round piece of steel, straight or curved, or of any other suitable material and form. This spring is placed loosely into the groove of the shank, and it bears on the point or cam *g*, projecting from the under or inner edge of the tongue C. The tongue C is held in place by a pivot, *a*, which may be inserted through holes drilled in the side flanges of the grooved shank E, and through said tongue, and fastened by riveting its ends, or said pivot may be cast solid with the tongue and dropped into the holes drilled in the side flanges of the shank. In the latter case the side flanges are spread open to admit the tongue, and after the spring and tongue are properly adjusted they (the side flanges) are closed up and the snap-hook is finished.

The cam *g* is located slightly forward of the pivot *a* of the tongue, so that the spring, pressing on said cam, will throw the point of the tongue up against the end of the hook A.

In order to render a snap-hook entirely safe, it is necessary that the tongue shall be pressed up against the hook with considerable force, and if this force is obtained by the action of a spring acting in the ordinary manner it is difficult to open the snap sufficiently wide to receive the large rings of ordinary harness without exerting a considerably increasing force on it with the thumb, and thereby the frequent use of a snap-hook of the ordinary construction becomes inconvenient and unsafe, because the spring is liable to loose its elasticity.

With my snap hook the spring exerts its greatest force on the tongue, while the latter is closed up against the hook, and the force required to open it is diminishing instead of increasing. In depressing the point of the tongue the cam *g* moves backward towards the pivot or fulcrum, and consequently the leverage with which the spring acts upon the tongue and the force required to open the snap gradually diminishes.

All the parts of my hook are simple, cheap, and durable, and when combined a hook is produced which meets all desirable qualities of such a device, and which on account of the great demand for such an article in the construction and use of harness becomes of great importance.

I claim as new and desire to secure by Letters Patent—

1. Placing the spring which acts upon the tongue of a snap-nook loosely into a recess cast or otherwise produced in the body of the hook, substantially as and for the purpose specified.

2. The cam *g*, on the inner edge of the tongue of a snap-hook, arranged in combination with the spring acting on said tongue and with its pivot in such a manner that the force in opening the tongue is diminishing instead of increasing.

Witnesses: RICHARD W. JONES.
H. R. OHUSTEIL,
L. F. CARPENTER.